(12) United States Patent
Sullivan et al.

(10) Patent No.: US 6,601,915 B2
(45) Date of Patent: Aug. 5, 2003

(54) PROGRAMMABLE SEAT BACK DAMPER ASSEMBLY FOR SEATS

(75) Inventors: John L. Sullivan, Ann Arbor, MI (US); John Matthew Ginder, Plymouth, MI (US); Kirsten Marie Carr, Ypsilanti, MI (US); Paul Ralph Schulz, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/946,263

(22) Filed: Sep. 4, 2001

(65) Prior Publication Data

US 2002/0047295 A1 Apr. 25, 2002

Related U.S. Application Data

(62) Division of application No. 09/346,380, filed on Jul. 1, 1999, now Pat. No. 6,312,049.

(51) Int. Cl.⁷ ................................................ B60N 2/42
(52) U.S. Cl. ............................ 297/216.1; 297/216.14
(58) Field of Search .................. 297/216.1, 216.12, 297/216.13, 216.14; 188/267; 267/140.14, 140.15

(56) References Cited

U.S. PATENT DOCUMENTS

| | | |
|---|---|---|
| 2,973,969 A | 3/1961 | Thall |
| 5,277,281 A | 1/1994 | Carlson et al. |
| 5,282,672 A | 2/1994 | Borlinghaus |
| 5,392,881 A | 2/1995 | Cho et al. |
| 5,398,917 A | 3/1995 | Carlson et al. |
| 5,492,312 A | 2/1996 | Carlson |
| 5,568,843 A | 10/1996 | Porter et al. |
| 5,652,704 A | 7/1997 | Catanzarite |
| 5,722,722 A | 3/1998 | Massara |
| 5,746,467 A | 5/1998 | Jesadanont |
| 5,772,280 A | 6/1998 | Massara |
| 6,050,637 A | 4/2000 | Haland et al. |
| 6,312,049 B1 * | 11/2001 | Sullivan et al. .......... 297/216.1 |

FOREIGN PATENT DOCUMENTS

| | | |
|---|---|---|
| CA | 497193 | 10/1953 |
| JP | 6-144089 | 11/1992 |

* cited by examiner

*Primary Examiner*—Peter M. Cuomo
*Assistant Examiner*—Stephen Vu
(74) *Attorney, Agent, or Firm*—David B. Kelley

(57) ABSTRACT

A programmable seat back damper assembly for a motor vehicle includes a generally horizontal seat cushion portion and a generally upright back portion operatively connected to the seat cushion portion. The programmable seat back damper assembly includes a recliner for operative connection to the seat back portion and the seat cushion portion. The programmable seat back damper assembly also includes a damper for operative connection to the seat back portion and the seat cushion portion and having a magneto-rheological (MR) fluid therein. The programmable seat back damper assembly further includes a controller electrically connected to the damper to control an apparent viscosity of the MR fluid to increase and decrease damping of the damper for adjusting an angle of the seat back portion relative to the seat cushion portion.

10 Claims, 3 Drawing Sheets

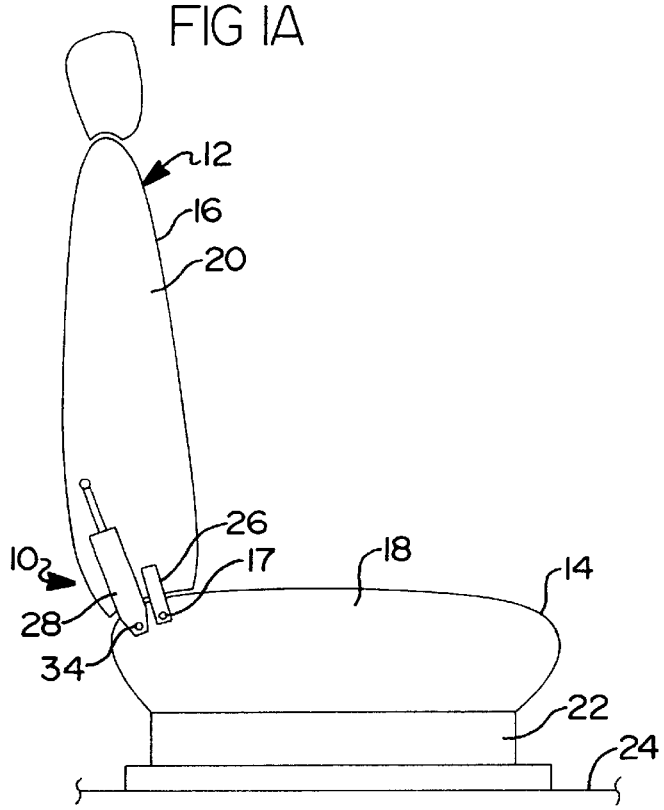
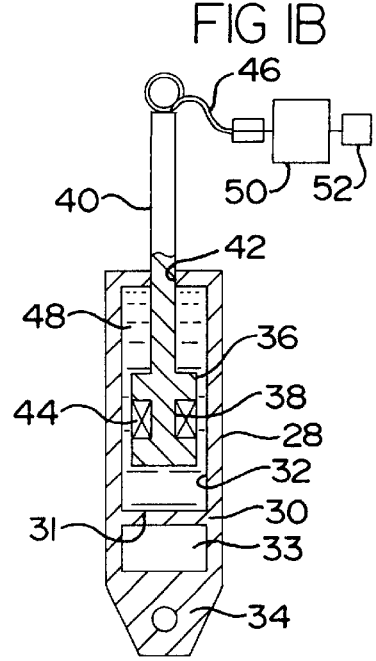
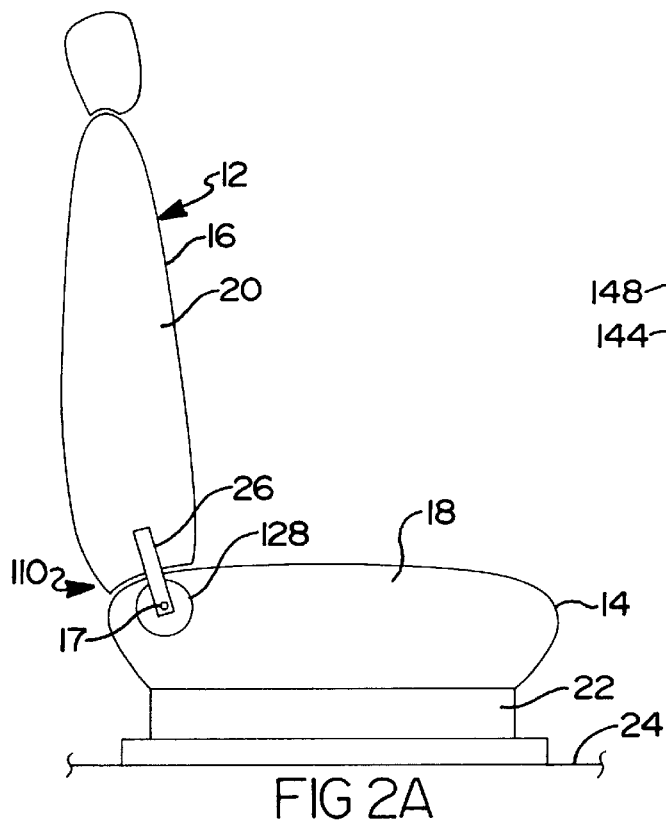
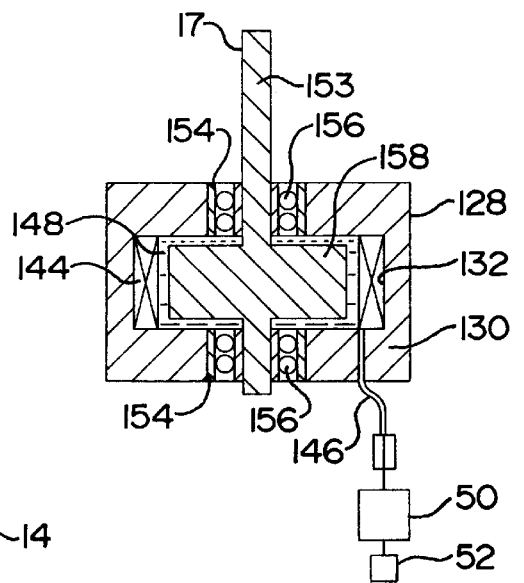

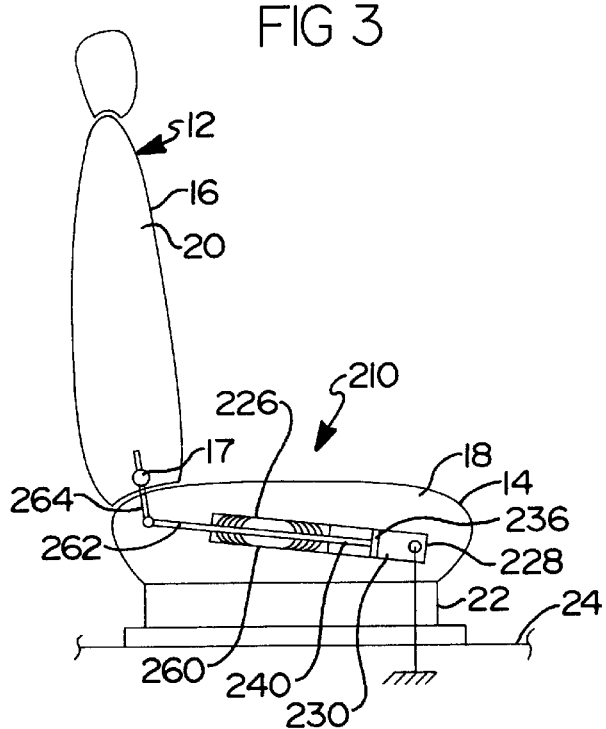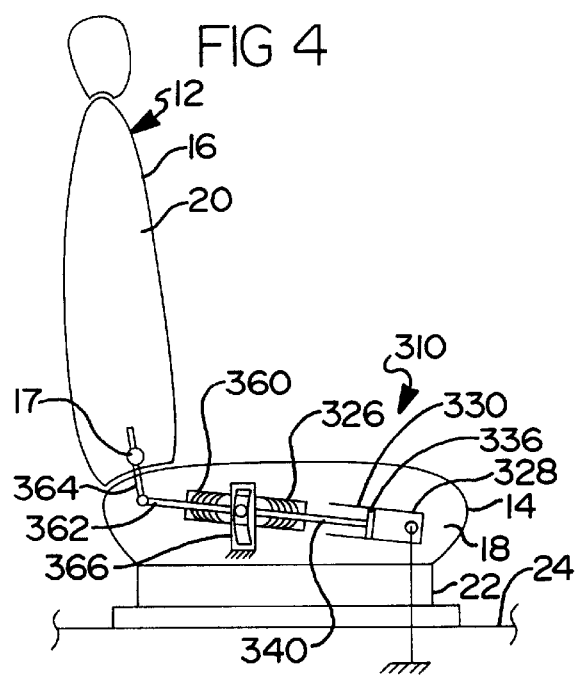

PROGRAMMABLE SEAT BACK DAMPER ASSEMBLY FOR SEATS

CROSS-REFERENCE TO RELATED APPLICATION(S)

This is a divisional of application Ser. No. 09/346,380, filed Jul. 1, 1999, now U.S. Pat. No. 6,312,049.

BACKGROUND OF THE INVENTION

1. Field of the Invention

The present invention relates generally to seats for motor vehicles and, more specifically, to a programmable seat back damper assembly for a seat in a motor vehicle.

2. Description of the Related Art

It is known to provide seats for motor vehicles such as an automotive vehicle. Typically, a seat includes a generally horizontal seat cushion portion and a generally vertical seat back portion operatively connected to the seat cushion portion. The seat may include at least one, preferably a pair of tracks to allow longitudinal adjustment of the seat cushion portion. The seat may include a recliner for reclining the seat back portion relative to the seat cushion portion by an occupant in the seat.

It is known to provide an energy absorber or damper for a seat back portion of a seat in a motor vehicle. An example of such a damper is disclosed in U.S. Pat. No. 5,722,722. In this patent, a damper and recliner are connected in a substantially parallel relationship with respect to each other and secured to the seat back portion and seat track. The recliner is configured to be disengageable in a high-energy impact, thereby allowing the damper to dissipate energy as the seat back portion pivots with respect to the seat track.

One disadvantage of the above damper is that it is not programmable to provide damping characteristics based on impact event characteristics. Another disadvantage is that the above damper does not allow limited rotation of the seat back portion. A further disadvantage is that the above damper and release mechanism includes a squib release mechanism, which is an explosive device that is not resettable for multiple uses.

SUMMARY OF THE INVENTION

Accordingly, the present invention is a programmable seat back damper assembly for a seat in a motor vehicle including a generally horizontal seat cushion portion operatively connected to vehicle structure and a generally upright seat back portion operatively connected to the seat cushion portion. The programmable seat back damper assembly includes a recliner for operative connection to the seat back portion and the seat cushion portion. The programmable seat back damper assembly also includes a damper for operative connection to the seat back portion and the seat cushion portion and having a magneto-rheological (MR) fluid therein. The programmable seat back damper assembly further includes a controller electrically connected to the damper to control an apparent viscosity of the MR fluid to increase and decrease damping of the damper for adjusting an angle of the seat back portion relative to the seat cushion portion.

One advantage of the present invention is that an improved programmable seat back damper assembly is provided for a seat in a motor vehicle. Another advantage of the present invention is that the programmable seat back damper assembly uses a magneto-rheological fluid damper to dissipate energy for a seat back of a vehicle seat. Yet another advantage of the present invention is that the programmable seat back damper assembly reduces occupant kinetic energy during an impact on the vehicle through programmed and limited seat back rotation. Still another advantage of the present invention is that the programmable seat back damper assembly can be programmed to provide a dampening profile based on impact event characteristics. A further advantage of the present invention is that the programmable seat back damper is resettable and useable.

Other features and advantages of the present invention will be readily appreciated, as the same becomes better understood, after reading the subsequent description when taken in conjunction with the accompanying drawings.

BRIEF DESCRIPTION OF THE DRAWINGS

FIG. 1A is a side elevational view of a programmable seat back damper assembly, according to the present invention, illustrated in operational relationship with a seat.

FIG. 1B is a fragmentary view of a portion of the programmable seat back damper assembly of FIG. 1A.

FIG. 2A is a side elevational view of another embodiment, according to the present invention, of the programmable seat back damper assembly of FIG. 1A.

FIG. 2B is a fragmentary view of a portion of the seat back damper assembly of FIG. 2A.

FIG. 3 is a schematic view of yet another embodiment, according to the present invention, of the programmable seat back damper assembly of FIG. 1A.

FIG. 4 is a schematic view of still another embodiment, according to the present invention, of the programmable seat back damper assembly of FIG. 1A.

FIG. 5 is a schematic view of a further embodiment, according to the present invention, of the programmable seat back damper assembly of FIG. 1A.

DESCRIPTION OF THE PREFERRED EMBODIMENT(S)

Figure 6:
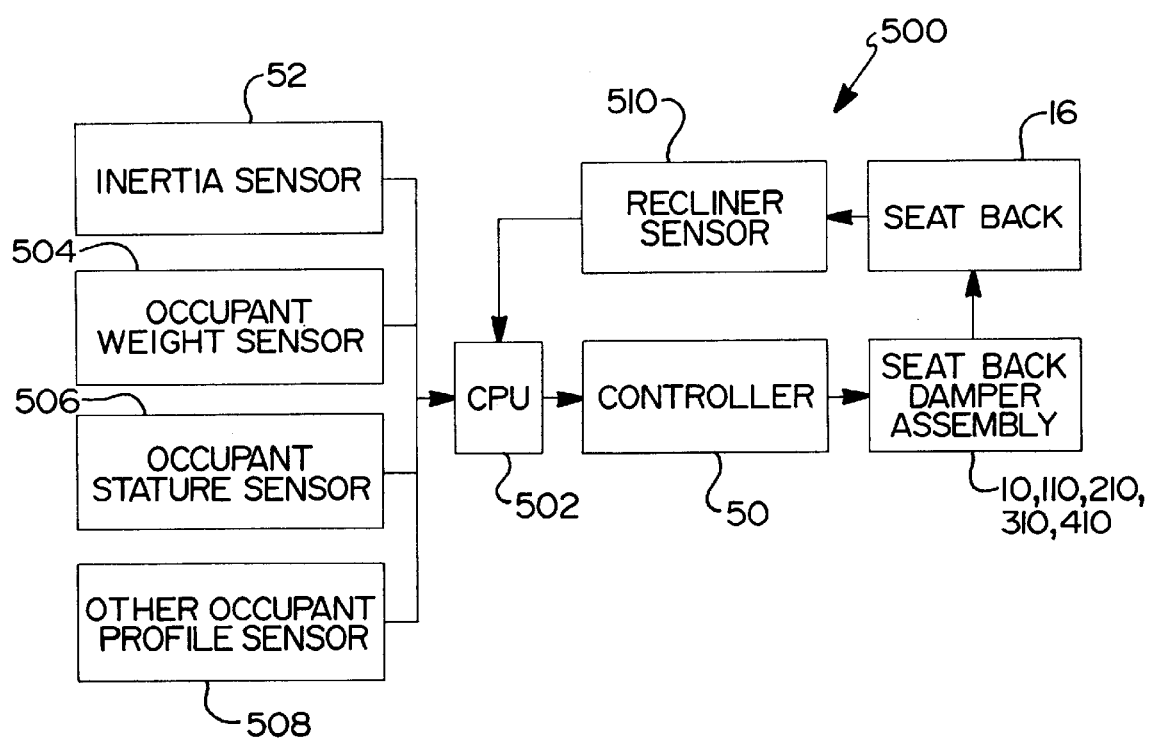
FIG. 6 is a schematic diagram of a control system for the programmable seat back damper assembly of FIGS. 1A through 5.

Referring now to the drawings and in particular FIG. 1A and 1B, one embodiment of a programmable seat back damper assembly 10, according to the present invention, is shown for a seat, generally indicated at 12, of a motor vehicle (not shown). The seat 12 includes a generally horizontal seat cushion portion or seat cushion 14 and a generally upright seat back portion or seat back 16 pivotally connected to the seat cushion 14 by a seat back pivot 17. The seat cushion 14 includes a seat pan (not shown) and a cushion 18 operatively connected to the seat pan by suitable means such as an adhesive. The seat back 16 includes a seat back frame (not shown) and a cushion 20 disposed about and operatively connected to the seat back frame by suitable means such as an adhesive. The seat 12 includes a track or lower seat frame member 22 mounted to the seat pan and vehicle structure 24 such as a floorpan. It should be appreciated that, except for the programmable seat back damper assembly 10, the seat 12 is conventional and known in the art.

As illustrated in FIG. 1A, the programmable seat back damper assembly 10 includes a recliner mechanism 26 interconnecting the seat back 16 and seat cushion 14. The recliner mechanism 26 is of a linear type as disclosed in U.S. Pat. No. 5,568,843 to Porter et al., the disclosure of which is hereby incorporated by reference. The recliner mechanism 26 has one end connected to the seat back frame and another end connected to a grounded location such as a track or lower seat frame member 22 or vehicle structure 24 to prevent free spinning of the seat back 16 about the pivot point 17. It should be appreciated that the recliner mechanism 26 is similar to that disclosed in U.S. Pat. No. 5,722,722 to Massara, the disclosure of which is hereby incorporated by reference. It should be appreciated that the seat back 16 pivots or reclines relative to the seat cushion 14.

As illustrated in FIGS. 1A and 1B, the programmable seat back damper assembly 10 includes a damper 28 interconnecting the seat back 16 and seat cushion 14. In this embodiment, the damper 28 is of a linear type. The damper 28 includes a housing 30 having a generally cylindrical shape with a cavity 32 therein. The housing 30 may incorporate a flexible diaphragm or floating piston 31 forming another cavity 33 that is pressurized to act as an accumulator for a fluid to be described. The housing 30 is made of a ferrous material. The housing 30 has one end 34 attached by suitable means (not shown) to either the track or lower seat frame member 22 or vehicle structure 24.

The damper 28 includes a piston 36 disposed within the cavity 32 of the housing 30 and movable therein. The piston 36 has a generally cylindrical shape with a generally circular cross-section. The piston 36 is made of a ferrous material. The piston 36 extends axially and has an annular groove or recess 38 circumferentially thereabout for a function to be described.

The damper 28 also includes a piston rod 40 disposed partially in the cavity 32 of the housing 30 and connected to the piston 36. The piston rod 40 has a generally cylindrical shape and has a generally circular cross-section. The piston rod 40 has one end connected to the piston 36 and extends axially through an aperture 42 in another end of the housing 30 and has another end connected to the seat back 16. A seal (not shown) is disposed about the piston rod 40 in the aperture 42 in the end of the housing 30. The piston rod 40 is made of a ferrous material. It should be appreciated that the piston rod 40 is hollow for a function to be described.

The damper 28 also includes a coil 44 disposed within the cavity 32 of the housing 30 and about the piston 36. The coil 44 is generally annular and disposed in the groove 38 of the piston 36. The coil 44 is spaced a predetermined distance from the housing 30. The coil 44 is connected by suitable means such as wires 46 to a source of power such as a controller 50 to be described.

The damper 28 further includes a magneto-rheological (MR) fluid 48 disposed in the cavity 32 of the housing 30 between the piston 36, the coil 44, and the housing 30. The MR fluid 48 contains magnetizable particles such as carbonyl iron spheroids of about one (1) to ten (10) microns in diameter dispersed in a viscous fluid such as silicone oil which has a viscosity of between about 20 and 50,000 mPa. It should be appreciated that the MR fluid 48 may also contain surfactants, flow modifiers, lubricants, viscosity enhancers, and other additives. It should also be appreciated that the MR fluid 48 is conventional and known in the art.

The programmable seat back damper assembly 10 includes a controller 50 such as a restraint control module connected by the wires 46 to the coil 44. The wires 46 extend from the controller 50 through the piston rod 40 to the coil 44. The controller 50 is programmable to send various amount of current to the damper 28. The damping force of the MR fluid 48 is programmed by the controller 50 based on various factors such as mass, stature, location and possibly age of an occupant (not shown) and the inertia sensed.

It should be appreciated that the amount of dampening provided is controllable and changeable during its operation depending upon the above factors.

The programmable seat back damper assembly 10 includes an inertia sensor 52 connected to the controller 50. The inertia sensor 52 sends a signal to the controller 50 of the amount of inertia sensed. It should be appreciated that the controller 50 and inertia sensor 52 are conventional and known in the art.

In operation of the programmable seat back damper assembly 10, during normal operating conditions, the recliner 26 operates as a conventional recliner to control the adjustment of the seat back 16 relative to the seat base 14. The recliner 26 is unlocked to allow adjustment and then locked to hold the chosen position. During this normal operation, the damper 28 is inactive and the piston 36 moves relative to the housing 30 as required to accommodate the position adjustment. When an impact collision condition occurs as sensed by the inertia sensor 52, a signal is sent to the controller 50. The controller 50 sends a signal to an actuator such as a solenoid (not shown) located on a housing (not shown) of the recliner 26 to disengage the recliner 26 and sends a signal simultaneously to the damper 28 to pass a current through the coil 44 to generate a magnetic field. The magnetic field increases the apparent viscosity of the MR fluid 48 and thus increases the damping force generated by the damper 28. The increased viscosity of the MR fluid 48 dissipates energy by allowing the seat back 16 to rotate about its pivot point and permits some highly damped occupants eat back rotation during the impact, thus reducing the kinetic energy of the occupant. When energy dissipation is completed, the controller 50 sends a signal to the actuator to re-engage the recliner 26 and deactivates the damper 28. It should be appreciated that the amount of current passed through the coil 44 is programmable by the controller 50, thus affecting the strength of the magnetic field and viscosity of the MR fluid 48. It should also be appreciated that the recliner 26 carries the load of the seat back 16 during normal driving condition, is disengaged when the damper 28 is to dissipate energy, and is re-engaged when the energy dissipation is completed. It should further also be appreciated that the programmable seat back damper assembly 10 is used on both sides of the seat 12.

Referring to FIGS. 2A and 2B, another embodiment 110, according to the present invention, of the programmable seat back damper assembly 10 is shown. Like parts of the programmable seat back damper assembly 10 have like reference numerals increased by one hundred (100). The programmable seat back damper assembly 110 includes a damper 128 of the rotary type. The damper 128 is attached to and disposed about a shaft 153 of the seat back pivot 17. The damper 128 includes a housing 130 disposed about and spaced radially from the shaft 153 of the seat back pivot 17. The housing 130 has a cavity 132 with axial open ends 154 to form a generally "C" shaped cross-section at each end. The housing 130 is made of a ferrous material. The recliner 26 is attached by suitable means (not shown) to the shaft 153 and the seat back support such as the frame of the seat back 16.

The damper 128 includes a bearing 156 disposed about the shaft 153 and in each open end 154 of the housing 130. The bearing 156 is of a sealed roller type to allow rotation of the shaft 153 relative to the housing 130.

The damper 128 also includes a driven member 158 disposed within the cavity 132 of the housing 130 and about the shaft 153. The driven member 158 is generally circular in shape. The driven member 158 may be one or more discs. The discs are alternated between rotatable discs fixed to the shaft 153 and stationary discs fixed to the housing 130. The driven member 158 is made of a ferrous material. The driven member 158 is fixed to the shaft 153 by suitable means such as a key (not shown).

The damper 128 also includes a coil 144 disposed within the cavity 132 of the housing 130 and about the driven member 158. The coil 144 is spaced a predetermined distance from the driven member 158. The coil 144 is connected by suitable means such as wires 146 to a source of power such as the controller 50.

The damper 128 further includes a magneto-rheological (MR) fluid 148 disposed in the cavity 132 of the housing 130 between the driven member 158, the coil 144, and the bearings 156. The operation of the programmable seat back damper assembly 110 is similar to the programmable seat back damper assembly 10.

Referring to FIG. 3, another embodiment 210, according to the present invention, of the programmable seat back damper assembly 10 is shown. Like parts of the programmable seat back damper assembly 10 have like reference numerals increased by two hundred (200). In this embodiment, the damper 228 and recliner 226 are arranged in series between the seat back 16 and seat cushion 14. The damper 228 and recliner 226 of the programmable seat back damper assembly 210 are of the linear type. The damper 228 has a housing 230, piston 236, and piston rod 240. The recliner 226 has a housing 260 and a rod 262 extending through the housing 260. The housing 230 has one end connected to the tracks or lower seat frame member 22 of the seat 12 or vehicle structure 24 such that it is mechanically grounded. The piston rod 240 has one end connected to the piston 236 and another end connected to the rod 262 of the recliner 226. The rod 262 of the recliner 226 is operatively connected to the frame of the seat back 16 by a link 264 such that the seat back 16 pivots about the seat back pivot 17. In this embodiment, the piston rod 240 and recliner rod 262 are a single rod. Similarly, the housing 230 and housing 260 are a single housing. The operation of the programmable seat back damper assembly 210 is similar to the programmable seat back damper assembly 10.

Referring to FIG. 4, another embodiment 310, according to the present invention, of the programmable seat back damper assembly 10 is shown. Like parts of the programmable seat back damper assembly 10 have like reference numerals increased by three hundred (300). In this embodiment, the damper 328 and recliner 326 of the programmable seat back damper assembly 310 are of the linear type. The damper 328 has a housing 330, piston 336, and piston rod 340. The recliner 326 has a housing 360 and a rod 362 extending through the housing 360. The housing 330 has one end connected to the tracks or lower seat frame member 22 of the seat 12 or vehicle structure 24 such that it is mechanically grounded. The piston rod 340 has one end connected to the piston 336 and another end connected to the rod 362 of the recliner 326. The rod 362 of the recliner 326 is operatively connected to the frame of the seat back 16 by a link 364 such that the seat back 16 pivots about the seat back pivot 17. In this embodiment, the piston rod 340 and recliner rod 362 are a single rod. The housing 330 and housing 360 are two separate housings. The programmable seat back damper assembly 310 also includes a bracket 366 connected to the housing 360 of the recliner 326 and the tracks or lower seat frame member 22 of the seat 12 such that it is mechanically grounded. The bracket 366 allows the recliner housing 360 to rotate about the damper pivot point and restrains movement of the recliner housing 360 relative to the rod axial direction. The bracket 366 has a slot 367 allows this motion. As the seat back 16 rotates, the recliner housing 360 moves upward in an arc motion. The operation of the programmable seat back damper assembly 310 is similar to the programmable seat back damper assembly 10.

Referring to FIG. 5, another embodiment 410, according to the present invention, of the programmable seat back damper assembly 10 is shown. Like parts of the programmable seat back damper assembly 10 have like reference numerals increased by four hundred (400). In this embodiment, the damper 428 and recliner 426 are arranged in parallel between the seat back 16 and seat cushion 14. The damper 428 and recliner 426 of the programmable seat back damper assembly 410 are of the linear type. The damper 428 has a housing 430, piston 436, and piston rod 440. The recliner 426 has a housing 460 and a rod 462. The housing 430 has one end connected to the tracks or lower seat frame member 22 of the seat 12 or vehicle structure 24 such that it is mechanically grounded. The housing 460 has one end connected to the tracks or lower seat frame member 22 of the seat 12 or vehicle structure 24 such that it is mechanically grounded. The piston rod 440, has one end connected to the piston 436 and another end connected to the rod 462 of the recliner 426. The rods 440 and 462 are operatively connected to the frame of the seat back 16 by a link 464 such that the seat back 16 pivots about the seat back pivot 17. In this embodiment, the piston rod 440 and recliner rod 462 are two separate rods. Similarly, the housing 430 and housing 460 are two separate housings. The operation of the programmable seat back damper assembly 410 is similar to the programmable seat back damper assembly 10.

Referring to FIG. 6, a control system 500, according to the present invention, is shown for the programmable seat back damper assembly 10,110,210,310,410. The control system 500 may include a central processing unit (CPU) 502 interconnecting the controller 50 and the inertia sensor 52. In this embodiment, the CPU 502 is optional and used to gather data and make a control profile for the controller 50 to execute. The control system 500 may also include at least one, preferably a plurality of sensors such as an occupant weight sensor 504, occupant stature sensor 506 and other occupant profile sensors 508 connected to the CPU 502. The sensors 504, 506 and 508 may be mounted in the seat 14 or a roof rail (not shown) or headliner (not shown) of the motor vehicle to provide information about the occupant seated in the seat 12. The control system 500 also includes the controller 50 connected to the CPU 502 and to the damper 28,128,228,328,428 of the programmable seat back damper assembly 10,110,210,310,410. The damper 28,128,228,328, 428 is operatively connected to the seat back 16 or recliner 26,126,226,326,426. The control system 500 may also obtain occupant information that is inputted by the occupant and stored in memory of the CPU 502 or obtained by a computer system that can interrogate occupants about their height, weight, etc.

The control system 500 may further includes a recliner sensor 510 interconnecting the recliner and the CPU 502. The recliner sensor 510 acts as a back-up redundant sensor to cooperate with the inertia sensor 52 to ensure proper performance of the control system 500. The recliner sensor 510 may be located in the recliner mechanism 26,226,326, 426 for the seat 12. It should be appreciated that the recliner sensor 510 provides an indication of the amount of reclining of the seat back 16 relative to the seat cushion 14. It should also be appreciated that the recliner sensor 510 is conventional and known in the art.

In operation of the control system 500, the sensors 504, 506,508 provide signals to the CPU 502 regarding the occupant. Upon an impact on the motor vehicle, the inertia sensor 52 provides a signal to the CPU 502 of vehicle impact conditions. The CPU 502 provides a signal to the controller 50 that controls the damper 28,128,228,328,428, in turn, controlling the angular adjustment of the seat back 16 relative to the seat cushion 14. The recliner sensor 510 provides a signal to the CPU 502 of the amount reclining of the seat back 16 relative to the seat cushion 14, which is then communicated to the controller 50 to control the damper 28,128,228,328,428.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A programmable seat back damper assembly for a seat in a motor vehicle comprising:
    a damper for operative connection to either one of a seat back portion, a recliner, and a seat cushion portion of the seat, said damper including a housing having a cavity and a magneto-rheological (MR) fluid disposed in said cavity; and
    a controller electrically connected to said damper and being programmable based on predetermined factors to send a signal thereto to generate a magnetic field to increase an apparent viscosity of the MR fluid to increase damping of said damper during an impact collision condition based on the predetermined factors, wherein in an impact on the motor vehicle, said damper dissipates energy as the seat back portion rotates relative to the seat cushion portion.

2. The programmable seat back damper assembly as set forth in claim 1 wherein said damper is a linear damper.

3. A programmable seat back damper assembly for a seat in a motor vehicle having a generally horizontal seat cushion portion and a generally upright seat back portion operatively connected to the seat portion, said programmable seat back damper assembly comprising:
    a recliner for operative connection to the seat back portion and the seat portion of the seat; and
    a damper for operative connection to either one of the seat back portion, said recliner, and the seat cushion portion and having a magneto-rheological (MR) fluid therein; and
    a controller electrically connected to said damper and being programmable based on predetermined factors to send a signal thereto to generate a magnetic field to increase an apparent viscosity of the MR fluid to increase damping of said damper during an impact collision condition based on the predetermined factors, wherein in an impact on the motor vehicle, said damper dissipates energy as the seat back portion rotates relative to the seat cushion portion; and
    wherein said damper includes a housing having a cavity, said MR fluid being disposed in said cavity.

4. The programmable seat back damper assembly as set forth in claim 3 wherein said damper includes a coil disposed in said cavity and electrically connected to said controller.

5. The programmable seat back damper assembly as set forth in claim 4 wherein said damper includes a piston being disposed in said cavity and movable therein.

6. The programmable seat back damper assembly as set forth in claim 1 including an inertia sensor electrically connected to said controller to sense inertia of the motor vehicle.

7. The programmable seat back damper assembly as set forth in claim 1 including at least one occupant sensor electrically connected to said controller to sense a profile of an occupant seated in the seat of the motor vehicle.

8. A programmable seat back damper assembly as set forth in claim 1 wherein said recliner and said damper are arranged in series between the seat back portion and the seat cushion portion.

9. A programmable seat back damper assembly for a seat in a motor vehicle having a generally horizontal seat cushion portion and a generally upright seat back portion operatively connected to the seat portion, said programmable seat back damper assembly comprising:
    a recliner for operative connection to the seat back portion and the seat portion of the seat; and
    a linear damper for operative connection to the seat back portion and the seat cushion portion, said damper including a housing having a cavity and a magneto-rheological (MR) fluid disposed in said cavity; and
    a controller electrically connected to said damper to control an apparent viscosity of the MR fluid to increase and decrease damping of said damper for adjusting an angle of the seat back portion relative to the seat cushion portion.

10. A programmable seat back damper assembly for a seat in a motor vehicle having a generally horizontal seat cushion portion and a generally upright seat back portion operatively connected to the seat portion, said programmable seat back damper assembly comprising:
    a recliner for operative connection to the seat back portion and the seat portion of the seat; and
    a damper for operative connection to the seat back portion and the seat cushion portion, said damper including a housing having a cavity and a magneto-rheological (MR) fluid disposed in said cavity, wherein said recliner and said damper are arranged in series between the seat back portion and the seat cushion portion; and
    a controller electrically connected to said damper to control an apparent viscosity of the MR fluid to increase and decrease damping of said damper for adjusting an angle of the seat back portion relative to the seat cushion portion.

* * * * *